United States Patent
Karanovic et al.

(10) Patent No.: US 12,464,462 B1
(45) Date of Patent: Nov. 4, 2025

(54) SYSTEM FOR PROVIDING INPUT TO A REMOTE DEVICE

(71) Applicant: PARTNER ONE ACQUISITIONS INC., Laval (CA)

(72) Inventors: Sasa Karanovic, Toronto (CA); Severin Smith, Toronto (CA); Brien Colwell, Redwood City, CA (US)

(73) Assignee: Partner One Acquisitions Inc., Laval (CA)

( * ) Notice: Subject to any disclaimer, the term of this patent is extended or adjusted under 35 U.S.C. 154(b) by 788 days.

(21) Appl. No.: 17/662,937

(22) Filed: May 11, 2022

(51) Int. Cl.
*H04W 52/00* (2009.01)
*H04W 4/80* (2018.01)
*H04W 52/02* (2009.01)
*H04W 76/34* (2018.01)

(52) U.S. Cl.
CPC ......... *H04W 52/0235* (2013.01); *H04W 4/80* (2018.02); *H04W 52/0274* (2013.01); *H04W 76/34* (2018.02)

(58) Field of Classification Search
CPC ............... H04W 52/0235; H04W 4/80; H04W 52/0274; H04W 76/34
See application file for complete search history.

(56) References Cited

U.S. PATENT DOCUMENTS

| | | | |
|---|---|---|---|
| 9,681,318 B1 | 6/2017 | Lachwani et al. | |
| 10,729,038 B1 | 7/2020 | Colwell et al. | |
| 10,855,789 B1 * | 12/2020 | Lachwani | H04L 67/56 |
| 11,019,129 B1 | 5/2021 | Colwell et al. | |
| 11,144,441 B1 | 10/2021 | Colwell et al. | |
| 11,416,383 B1 | 8/2022 | Kinnunen et al. | |
| 11,531,613 B1 | 12/2022 | Lomnitz et al. | |
| 11,625,506 B1 | 4/2023 | Smith et al. | |
| 12,069,537 B2 | 8/2024 | Lomnitz et al. | |
| 2012/0202428 A1 * | 8/2012 | Mirbaha | H04L 12/189 455/41.2 |
| 2013/0324098 A1 * | 12/2013 | Piemonte | H04W 16/22 455/418 |
| 2022/0141666 A1 * | 5/2022 | Armerding | H04W 12/06 726/12 |

(Continued)

OTHER PUBLICATIONS

U.S. Appl. No. 15/783,859, filed Oct. 13, 2017, Lachwani et al.
U.S. Appl. No. 15/941,674, filed Mar. 30, 2018, Lachwani et al.

*Primary Examiner* — Md K Talukder
(74) *Attorney, Agent, or Firm* — FOLEY & LARDNER LLP

(57) ABSTRACT

An application may be tested under conditions associated with a computing device at a remote location by causing the computing device to perform various functions. However, if the computing device has entered into a locked or sleep mode, physical input such as the input of a password, number, or gesture may normally be required to terminate the locked or sleep mode. To enable inputs to be provided to the computing device from a remote location, the device may be paired with a communication device, such as a Bluetooth device, that is able to receive commands from a control device. Inputs from the communication device may be processed in the same manner as inputs from a human input device, such as a Bluetooth keyboard or mouse device, enabling the computing device to be transitioned from the locked or sleep mode without requiring physical input.

16 Claims, 7 Drawing Sheets

(56) References Cited

U.S. PATENT DOCUMENTS

2022/0206912 A1 6/2022 Smith et al.
2023/0328171 A1\* 10/2023 Caro ................. H04M 1/72469
                                                                                     455/418

\* cited by examiner

SYSTEM FOR PROVIDING INPUT TO A REMOTE DEVICE

BACKGROUND

Applications may function differently at different locations, on different devices, and under different network conditions. Testing the performance of various functions of an application under different sets of conditions may enable issues regarding the performance of an application to be identified and improved, errors to be addressed, and so forth. However, maintaining remote access to different types of devices at different locations for testing purposes may be hindered by various features of the device, such as security features that lock or otherwise prevent access to the device without some input being provided to the device. Additionally, some devices may not be configured to receive and process remote inputs or test inputs provided using conventional debugging channels, hindering the ability to test the performance of the device.

INCORPORATION BY REFERENCE

U.S. patent application Ser. No. 14/850,798, filed Sep. 10, 2015 and titled "System for Application Test", now U.S. Pat. No. 9,681,318, is hereby incorporated by reference in its entirety.

U.S. patent application Ser. No. 15/425,757, filed Feb. 6, 2017 and titled "Mobile Device Point of Presence Infrastructure", now U.S. Pat. No. 10,729,038, is hereby incorporated by reference in its entirety.

U.S. patent application Ser. No. 15/425,652, filed Feb. 6, 2017 and titled "System for Management of an Array of Proxy Access Devices", now U.S. Pat. No. 10,855,789, is hereby incorporated by reference in its entirety.

U.S. patent application Ser. No. 15/619,181, filed Jun. 9, 2017 and titled "System for Assisting in Assessment and Mitigation of Data Network Operations", now U.S. Pat. No. 11,144,441, is hereby incorporated by reference in its entirety.

U.S. patent application Ser. No. 15/783,859, filed Oct. 13, 2017 and titled "System for Testing Using Remote Connectivity" is hereby incorporated by reference in its entirety.

U.S. patent application Ser. No. 16/593,847, filed Oct. 4, 2019 and titled "Secure Enclosure for Devices Used to Test Remote Connectivity" is hereby incorporated by reference in its entirety.

U.S. patent application Ser. No. 15/941,674, filed Mar. 30, 2018 and titled "Interactive Application Testing System Using Remote Resources" is hereby incorporated by reference in its entirety.

U.S. patent application Ser. No. 16/056,797, filed Aug. 7, 2018 and titled "System for Controlling Transfer of Data to a Connected Device", now U.S. Pat. No. 11,019,129, is hereby incorporated by reference in its entirety.

U.S. patent application Ser. No. 17/139,350, filed Dec. 31, 2020, and titled "System for Determining Audio and Video Output Associated with a Test Device" is hereby incorporated by reference in its entirety.

U.S. patent application Ser. No. 17/179,136, filed Feb. 18, 2021, and titled "Systems for Remote Communication with Test Devices" is hereby incorporated by reference in its entirety.

U.S. patent application Ser. No. 17/206,926, filed Mar. 19, 2021, and titled "Systems for Remote Determination of Data from Test Devices" is hereby incorporated by reference in its entirety.

U.S. patent application Ser. No. 17/302,884, filed May 14, 2021, and titled "Systems for Controlling Acquisition of Test Data from Devices" is hereby incorporated by reference in its entirety.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
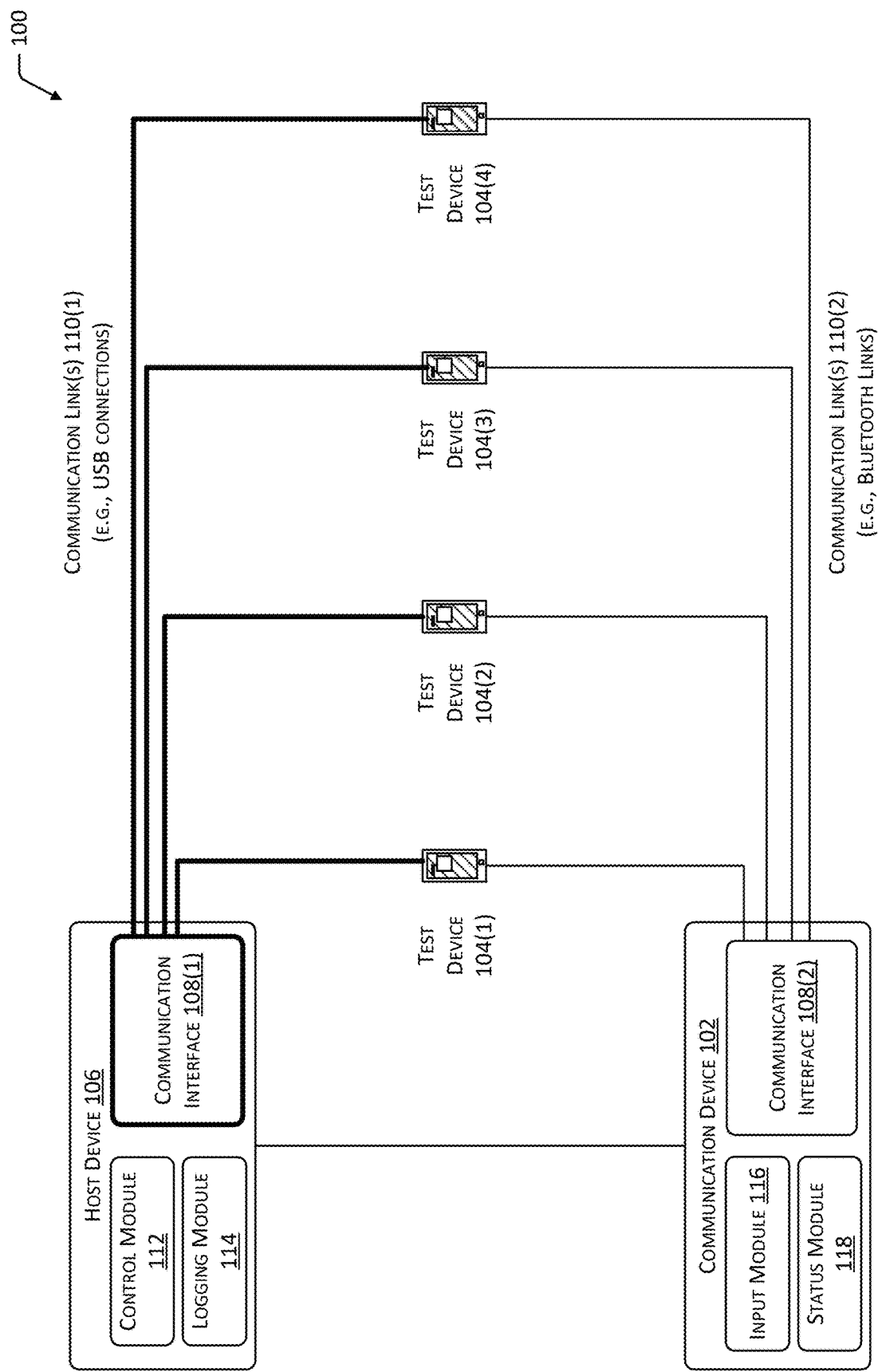
FIG. 1 is a diagram depicting an implementation of a system that may use inputs from a communication device to transition test devices from a non-responsive state when the test devices are not responsive to communications from a host device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A computing device may provide various functions, some of which may be associated with execution of one or more applications. A computing device may include, for example, a smartphone, a laptop computer, a tablet computer, a desktop computer, a server, an embedded computing device, a wearable computing device, an appliance, a computing device associated with a vehicle (such as an infotainment system or vehicle management or monitoring system), a set top box device, a smart television, a network-enabled speaker, and so forth. The functions provided by a computing device may include, without limitation, retrieval, transmission, or processing of data, presentation of output using a display, speaker, or other type of output device, acquisition of input using a camera, microphone, or other input device, and so forth.

The performance of an application executed by a computing device may be affected by various characteristics, such as conditions associated with the networks used at the location of the computing device, the hardware or software components of the computing device, interactions between components of the computing device and components of the networks, and so forth. A developer of an application may seek to test performance of the application, or of a computing device executing the application, under certain conditions. The testing process may enable the developer to discover issues that occur during use of the application under those conditions, which the developer may then address to attempt to improve performance of the application. However, maintaining devices of different types that are accessible at a large number of locations may be impractical. For example, maintaining the presence of human users at a large number of locations to prepare, activate, or otherwise cause a computing device to be available for testing purposes may be difficult, may be associated with a significant expenditure of resources, or may not be possible in some cases.

While it may be possible to access computing devices remotely, such as using a workstation at a first location to cause a computing device at a second location to execute an application and perform various functions for testing purposes, this testing process may be hindered by various features of the computing device. For example, a smartphone or tablet computer may be configured to enter a locked or sleep mode if no user input is received for a selected length of time. In such a case, debugging commands, or other types of remote commands, may not be usable until the device has transitioned from the locked or sleep mode. Transitioning a device from a locked or sleep mode typically requires user input, such as entry of a passcode, number, pattern, or other type of input. In many cases, the physical presence of a user to provide such input at the locations of a large number of test devices, is impractical. While physical devices that simulate physical input from a user may be used in some cases, equipping a large number of computing devices with such physical devices may be a resource-intensive task. Additionally, in some cases, a device may not be configured to receive and process inputs from a remote source, or through use of a conventional debugging link. While such a device may be used for test purposes manually, such as using a human operator or a physical device to provide inputs to the device, use of human operators for such a purpose may be impractical.

Described in this disclosure are techniques for remotely accessing a computing device that may be inaccessible using an existing debugging or networked connection, such as if the computing device has entered a locked or sleep mode. A first computing device may communicate with multiple test devices. For example, the first computing device may use a first communication interface to provide commands or other input to cause the test devices to perform various functions, receive logs and other input from the test devices to determine conditions associated with the test devices, determine characteristics of inputs received and outputs presented by the test devices, and so forth. For example, the first communication interface may communicate with various devices using a Universal Serial Bus (USB) protocol. However, in cases where a test device enters a locked or sleep mode, the first computing device may be unable to provide commands to control the test device, or receive one or more types of data from the test device, using the first communication interface. For example, many smartphones or tablet computing devices may be configured to enter into a locked or sleep mode if no input is received for a selected length of time, and may require the input of a password, number, pattern, or other type of input to transition the test device from the locked or sleep mode to enable other computing devices to communicate with the test device. In such a case, the first computing device may use a communication device incorporated within the first computing device, or in other implementations incorporated within a second computing device that communicates with the first computing device, to provide inputs to the test device using the second communication interface. The inputs provided using the second communication interface may be interpreted by the test device as though the inputs were provided using a human input device that is in communication with the test device, and the test device may be configured to terminate the locked or sleep mode in response to the inputs.

For example, the communication device may include Bluetooth communication components, or components for initiating a communication link using another protocol. The communication device may be paired with one or more test devices, or otherwise configured to initiate a communication link and communicate with the test device(s), such as by exchanging data indicative of the Media Access Control (MAC) addresses of each device. Many types of test devices, such as smartphones and tablet computers, include accessibility features that allow use of human input devices that communicate with the test devices via a Bluetooth communication interface or other type of communication interface. For example, a smartphone or tablet computer may include accessibility features that allow inputs from a keyboard device to be transmitted to the smartphone or tablet computer using a Bluetooth communication link. These accessibility features may enable inputs to be provided to a test device that is in a locked or sleep mode, such as to input a password, number, or pattern into a lock screen of a test device. For example, a test device may be configured to permit such inputs from a paired Bluetooth human input device to enable users that have difficulty providing direct input to the test device, or do not wish to provide direct input to the test device, to transition the test device from the locked or sleep mode.

Therefore, if the first computing device determines that a test device has entered a locked or sleep mode, such as if the first computing device is unable to detect the test device or determines a data transmission failure such as the inability to exchange data with the test device using a debug link or other type of communication channel, the first computing device may provide a command to the communication device to cause the communication device to provide one or more inputs to the test device using a different communication interface. The communication device may initiate a communication link with the test device to provide the inputs. In some implementations, one or more delays may be included between inputs provided to the test device. For example, a first input, or a first portion of a series of inputs, may be provided to the test device, then a second input, or a second portion of a series of inputs, may be provided a selected length of time after the first input or first portion of the inputs was provided. The passage of time between inputs or sets of inputs may enable the inputs to be processed by a test device that includes features for detecting and refraining from processing inputs originating from an automated source, such as by providing the inputs with a timing associated with input by a human user. While the communication device may not necessarily include a physical input device, the inputs will be received and processed by the test device as inputs that were provided by a human input device, such as a keyboard, mouse device or other type of pointer device, or touch sensor. Once the communication device or first computing device determines that the test device is accessible to the first computing device (e.g., no longer in the locked or sleep mode), the communication device may terminate the communication link with the test device. Termination of the communication link may enable the test device to perform functions, such as receiving input and presenting output, in the same manner that these functions would be performed in the absence of communication with a human input device. For example, the test device may display a first user interface when no communication link exists with the communication device, but may begin to display a second user interface when the communication link is established. When the communication link is terminated, the test device may return to displaying the first user interface, or may display a third user interface. Continuing the example, a smartphone or tablet computer may be configured to cease presentation of a touchscreen-based keyboard when a communication link with a Bluetooth keyboard is detected, but may resume presentation of the touchscreen-based keyboard when the communication link is terminated.

Implementations within the present disclosure may therefore enable a remote computing device to transition a test device from a locked or sleep mode without requiring the presence of a human user or a physical input device to provide input to the test device. Through use of a paired Bluetooth communication device, or a communication device that uses a different protocol, a computing device may be used to provide input via a communication link that is processed by the test device in the same manner as physical input received from a human input device. These inputs may be used to provide a passcode, number, pattern, or other type of input, such as to transition the test device from a locked or sleep mode. The communication device may then terminate the communication link with the test device to enable the test device to perform functions unaffected by communication with the communication device.

In some implementations, the communication device may also be used to directly test accessibility functions of a test device, such as the ability of a test device to receive and process inputs from a human input device under various conditions. In some cases, the communication device may also be used to efficiently provide complex inputs to a test device, such as non-Latin characters, combinations of keypresses or other inputs, mouse clicks or other inputs from a pointer device, scroll inputs, touch points, and so forth.

Additionally, in some implementations, the communication device may be used to test performance of a device that is not configured to receive and process inputs using a conventional debugging link. For example, certain types of test devices may be unable to receive and process data via a USB connection to cause the test device to perform a function as though an input was received. In such a case, the communication device may instead be used to provide inputs to the test device in the manner of a human input device. For example, inputs to a host or control device that are intended to cause a test device to perform a function may be provided to a communication device, which may provide data indicative of these inputs to the test device using a Bluetooth communication link or other type of communication link. The test device may receive and process these inputs as though the inputs were received from a human input device, such as a Bluetooth keyboard or mouse device (e.g., pointer device), another type of input device, or a device associated with a different communication protocol. Output from the test device may then be used to determine performance of the test device or of an application executed by the test device. In cases where output presented by the test device is unable to be obtained directly from the test device, such as via a USB or other type of communication link, output presented by the test device may be captured using one or more cameras, microphones, or other types of input devices. The camera(s), microphone(s), or other input device(s) that acquire the output presented by the test device may then provide at least a portion of this data to the host or controller device, or to another computing device. Implementations described herein may therefore be used to perform tests using devices that are not configured to, or unable to, receive and process test inputs using a USB or other type of debugging communication link.

FIG. 1 is a diagram 100 depicting an implementation of a system that may use inputs from a communication device 102 to transition test devices 104 from a non-responsive state when a test device 104 is not responsive to communications from a host device 106. The host device 106 may include any type of computing device including, without limitation, a server, a personal computing device such as a workstation, a portable computing device, a wearable computing device, a vehicle-based computing device, a networked media device such as a speaker, remote control, or game controller, or other types of computing devices. Additionally, while FIG. 1 depicts a single host device 106, any number of computing devices may be used to perform the functions described herein with regard to the host device 106. Further, while FIG. 1 depicts a single host device 106 that engages multiple test devices 104, any number of host devices 106 and test devices 104 may be used. For example, in other implementations, a single test device 104 may communicate with a single host device 106, or with multiple host devices 106, or multiple host devices 106 may communicate with multiple test devices 104.

The host device 106 may include a first communication interface 108(1) that may be used to exchange data with one or more test devices 104. For example, using the first communication interface 108(1), the host device 106 may establish communication links 110(1) with each test device 104. In some implementations, the communication interface 108(1) may be associated with a Universal Serial Bus (USB) protocol. For example, the host device 106 may be physically connected to one or more test devices 104, such as through use of one or more USB cables or other types of connectors. In other implementations, the host device 106 may communicate with one or more test device(s) 104 using other protocols. For example, connections between the host device 106 and at least a subset of the test device(s) 104 may include wireless communication links 110. While FIG. 1 depicts the host device 106 in communication with four test devices 104, any number of test devices 104 may communicate with the host device 106 using any combination of wired or wireless methods of communication. In some implementations, the host device 106 may be placed in a secure enclosure with a selected number of test devices 104, such as eight test devices 104, and may cause the test devices 104 to perform various functions to test the performance of an application or of the test devices 104 under network conditions at the location of the secure enclosure. While FIG. 1 depicts the test device(s) 104 as portable computing devices, such as smartphones, the test device(s) 104 may include any type of computing device(s) including, without limitation, the types of computing devices described with regard to the host device 106.

The host device 106 may include a control module 112 that may be used to provide commands or other data to one or more test devices 104 to cause the test device(s) 104 to perform a function, such as executing or using a particular function of an application to be tested. In some implementations, inputs provided using the control module 112 may be generated and provided by a computing device executing instructions, such as during an automated portion of a testing process. In other implementations, inputs provided using the control module 112 may be based on human inputs, such as inputs received from a human user that provides input to an input device that communicates with the host device 106. A logging module 114 associated with the host device 106 may receive data indicative of received inputs, presented outputs, or other metrics associated with one or more of the test devices 104, which may be used to determine performance of the application or the test device(s) 104 under various conditions, generate logs or reports, and so forth. In some cases, a test device 104 may enter into a non-responsive state and may cease responding to commands or other data from the host device 106, providing data that may be used by the logging module 114, and so forth. For example, some types of test devices 104, such as tablet computers or smartphones, may be configured to enter into a locked mode or sleep mode under various conditions, such as passage of a period of time during which input is not received, a state associated with the power source of the test device 104, and so forth. Typically, to transition a test device 104 from a locked mode or a sleep mode, physical input must be provided to the test device 104, such as by inputting a passcode or pattern, or other type of selected input. However, maintaining human users or automated devices that may provide physical input to a large number of test devices 104 at a large number of locations may be impractical or may be extremely resource-intensive.

A communication device 102 may be used to provide inputs to one or more test devices 104 in cases where the test device(s) 104 become non-responsive to data from the host device 106. In some cases, as shown in FIG. 1, the communication device 102 may be a separate computing device from the host device 106 and may include any type of computing device including, without limitation, the types of computing devices described with regard to the host device 106. In some implementations, the communication device 102 may include a dongle, chipset, or other type of device that may engage a USB port of the host device 106. As another example, the communication device 102 may be placed in wired or wireless communication with the host device 106 using one or more communication interfaces 108. In other implementations, at least a portion of the components of the communication device 102 described herein may be included within the host device 106, and at least a portion of the functions described herein with regard to the communication device 102 may be performed by the host device 106.

The communication device 102 may include a second communication interface 108(2) that may communicate using a different communication protocol or type of communication link 110 than those associated with first communication interface 108(1) associated with the host device 106. For example, the second communication interface 108(2) may communicate using one or more Bluetooth communication protocols. Continuing the example, the communication device 102 may be paired with one or more test devices 104, such as through the exchange of data that may enable the communication device 102 to detect availability of a test device 104 to establish a communication link 110(2). Therefore, the communication device 102 may establish alternate communication links 110(2) with one or more test devices 104 when the test device(s) 104 are not responsive using communication links 110(1) established with the host device 106, such as when the test device(s) 104 are in a locked or sleep mode.

For example, the communication interface 108(2) of the communication device 102 may enable the communication device 102 to communicate inputs or other data to one or more test devices 104 in the same manner as an external human input device, such as a keyboard, a mouse device or other type of pointer device, or another type of input device that may communicate with a test device 104 using a Bluetooth communication link. Certain types of test devices 104, such as tablet computers or smartphones, may include accessibility features that enable the test device 104 to respond to input from external human input devices, such as when a human user has difficulty providing input to a touchscreen or other component of a test device 104, or when a human user prefers to use an external human input device to interact with the test device 104. Therefore, a test device 104 may be responsive to data from the communication device 102 sent via a communication link 110(2) associated with the second communication interface 108(2), even at times when the test device 104 is in a locked mode or a sleep mode and is not responsible to data from the host device 106. While the communication device 102 may not necessarily include a physical human input device, the communication link 110(2) between the communication device 102 and the test device 104 may be associated with data indicative of a human input device, which may cause the test device 104 to process inputs received via the communication link 110(2) as inputs from a human input device.

When a test device 104 is not responsive to a host device 106, not detectable by the host device 106, or if a locked or sleep mode associated with the test device 104 is determined by the host device 106, the host device 106 may provide a command to an input module 116 of the communication device 102. The command may indicate a particular test device 104 or set of test devices 104, such as by indicating a MAC address or other identifier indicative of a test device 104, and may indicate one or more inputs to be provided, such as a series of keypresses or gestures that correspond to a passcode to transition the test device 104 from a locked mode. The input module 116 may generate data indicative of the inputs, and this data may then be sent to the indicated test device(s) 104 via one or more communication links 110(2). In some implementations, the communication device 102 may provide inputs separated by a length of time to enable the inputs to be processed if the test device 104 that includes features for detecting and refraining from processing inputs from an automated source, such as multiple inputs received in a short period of time. If the inputs from the communication device 102 cause a test device 104 to become responsive, such as by terminating a locked mode or sleep mode, the responsiveness of the test device 104 may be determined by the host device 106 or communication device 102, and the communication link 110(2) between the communication device 102 and the test device 104 may be terminated to enable normal operation of the test device 104 in the absence of a communication link 110(2) with a human input device. For example, an application associated with a test device 104 may function differently, such as by omitting presentation of an on-screen keypad, at times when a communication link 110(2) with a human input device is determined by the test device 104. Termination of the communication link 110(2) may enable the test device 104 to function as though no external human input device is in communication with the test device 104.

A status module 118 associated with the communication device 102 may determine status data associated with one or more test devices 104. For example, status data may indicate particular test devices 104 with which the communication device 102 has been paired or may otherwise establish communication. The status data may indicate particular test devices 104 that are detected by the communication device 102, particular test devices 104 with which the communication device 102 may establish a communication link 110(2), particular test devices 104 that are determined to be in a locked mode or sleep mode, and so forth. In some implementations, at least a portion of the status data may be communicated to the host device 106. For example, the host device 106 may determine that a test device 104 has entered a non-responsive state based on data received from the communication device 102. In other implementations, the communication device 102 may be configured to provide inputs to a test device 104 independent of commands or other data from the host device 106, such as if a test device 104 is determined by the communication device 102 to have entered a locked mode.

Figure 2A:
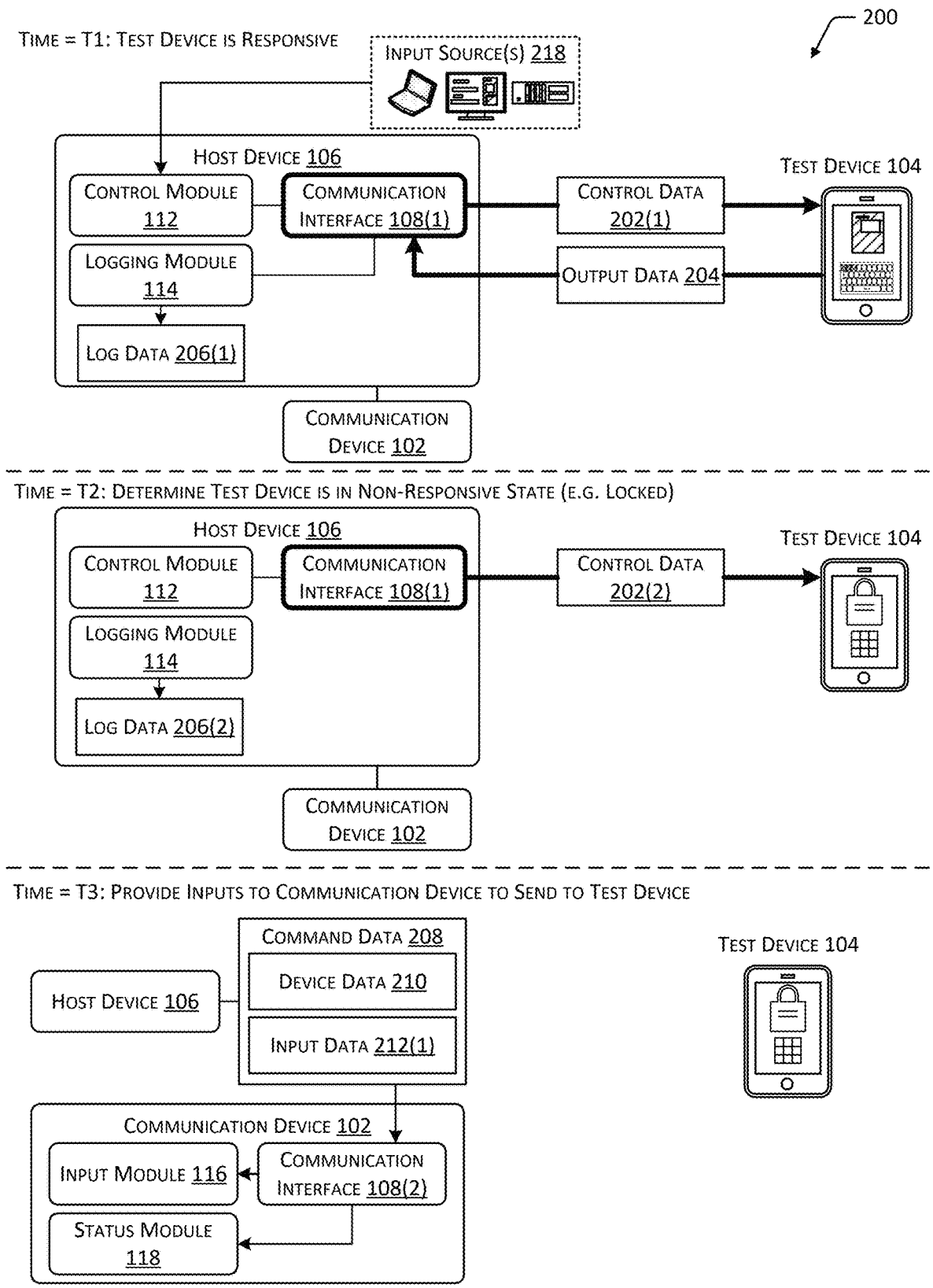
FIGS. 2A and 2B are diagrams depicting an implementation of a process for transitioning a test device from a non-responsive state to enable data from the test device to be acquired by a host device.
Figure 2B:
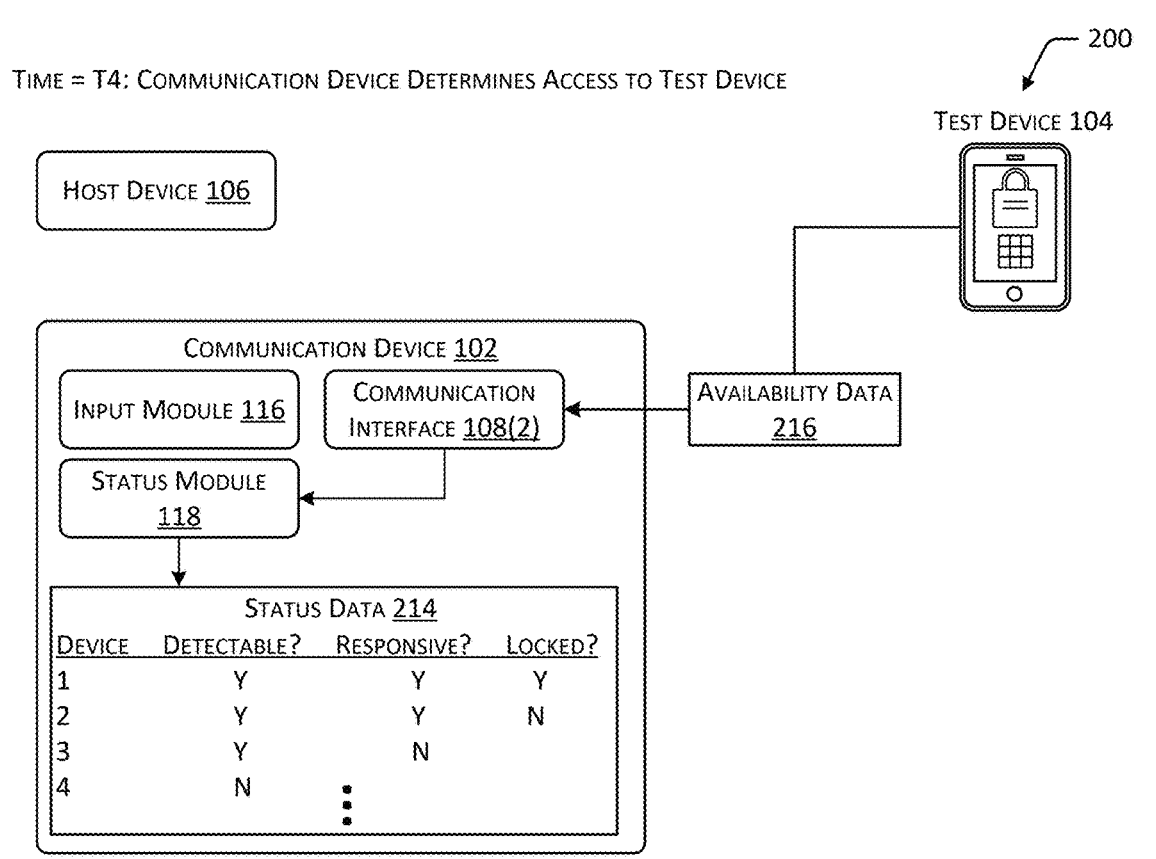
Figure 2B:
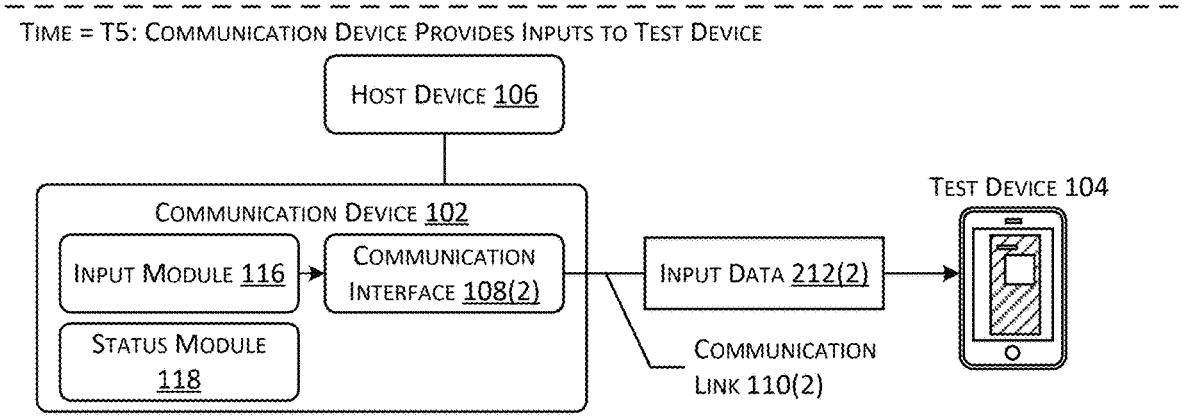
Figure 2B:
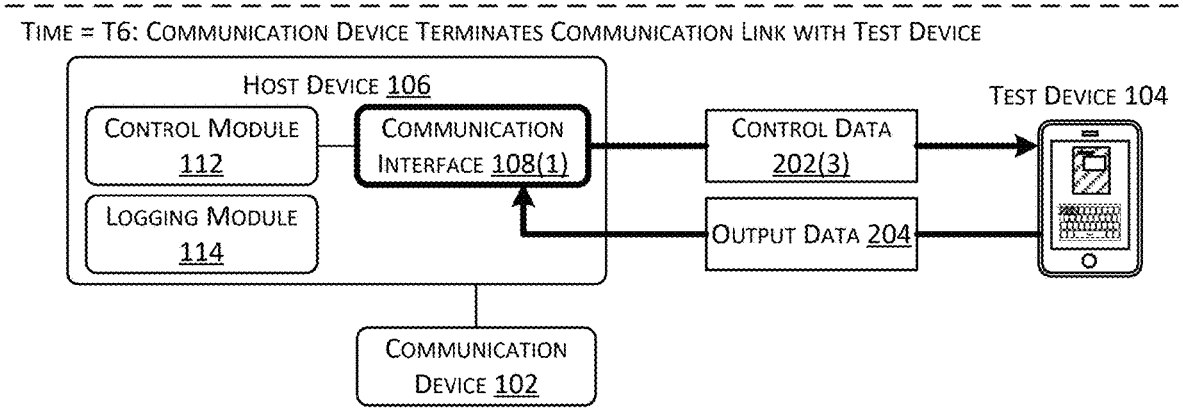

FIGS. 2A and 2B are diagrams 200 depicting an implementation of a process for transitioning a test device 104 from a non-responsive state to enable data from the test device 104 to be acquired by a host device 106. As shown in FIG. 2A, at a first time T1, a host device 106 may exchange data with a test device 104 that is responsive to communications from the host device 106. For example, the host device 106 may be used to provide control data 202(1) to the test device 104, which may cause the test device 104 to execute an application, perform one or more functions associated with the application, perform one or more functions associated with the test device 104, and so forth. In some implementations, the host device 106 may determine and provide control data 202(1) indicative of one or more inputs to the test device 104 automatically, such as by accessing data or executing instructions associated with a test process. In other implementations, the host device 106 may receive inputs from one or more input sources 218, which may include user input from human operators, automated input from computing devices, or combinations thereof, which in turn may cause control data 202(1) to be provided to the test device 104. The test device 104 may provide output data 204 to the host device 106 indicative of one or more characteristics of the test device 104, application, or networks or other devices associated with the test device 104. For example, the output data 204 may indicate inputs received by the test device 104, outputs presented by the test device 104 such as audio or video output, processor or memory utilization of the test device 104, data throughput of the test device 104, a state of a power source of the test device 104, utilization of one or more hardware or software components of the test device 104, network conditions associated with one or more networks used by the test device 104, and so forth. The host device 106 may determine log data 206(1) based on at least a portion of the output data 204 received from the test device 104. For example, log data 206(1) may be used to generate reports indicative of performance of the application or test device 104 at various times and under various conditions.

At a second time T2, the host device 106 may determine the test device 104 is in a non-responsive state. For example, the test device 104 may initiate a locked mode or sleep mode. In such a case, the test device 104 may remain non-responsive to control data 202(2) from the host device 106 until one or more inputs are provided to the test device 104 to transition the test device 104 from the non-responsive state. Log data 206(2) determined by the logging module 114 may indicate a lack of receipt of output data 204 or other data from the test device 104, non-responsiveness of the test device 104, and so forth. Typically, a human user or automated input device may provide physical inputs to the test device 104 to transition the test device 104 from the non-responsive state. However, in some cases, a human user or automated input device may not be available. For example, if a large number of test devices 104 are maintained at different locations, retaining human users at each location, or automated input devices for each device, may be impractical or may be a resource-intensive task. In some implementations, a host device 106 may determine a lack of response from a test device 104 when control data 202 is sent to the test device 104, without first receiving output data 204 from the test device 104 as described with regard to the first time T1. For example, a test device 104 may be in a locked state or other type of non-responsive state before first control data 202(1) is sent to the test device 104, and the actions described with regard to the first time T1 may not occur. Instead, the test device 104 may be unresponsive to the initial control data 202(1) received from the host device 106, and the process may proceed as described below with regard to the remainder of FIGS. 2A and 2B.

At a third time T3, in response to determining that the test device 104 is in a non-responsive state, the host device 106 may provide command data 208 to the communication device 102 to cause the communication device 102 to provide one or more inputs to the test device 104 to transition the test device 104 from the non-responsive state. In some implementations, the command data 208 may include device data 210 indicative of a particular test device 104, such as a MAC address or other identifier that may be used to differentiate the particular test device 104 from one or more other computing devices. The command data 208 may also include input data 212(1) indicative of one or more inputs to be provided to the test device 104. For example, the input data 212(1) may correspond to a password, numeral, gesture, or other input that may be used to transition the test device 104 from a locked mode.

As shown in FIG. 2B, at a fourth time T4, the communication device 102 may determine access to the test device 104. For example, a status module 118 associated with the communication device 102 may determine status data 214 indicative of test devices 104 that may be detected by the communication device 102. In some cases, the status data 214 may indicate whether a test device 104 is responsive to data from the communication device 102, such as whether the communication device 102 is able to initiate a communication link 110(2) with the test device 104. Additionally, in some cases, the status data 214 may indicate whether a test device 104 is in a locked or sleep mode, or other status information regarding the test device 104. In some implementations, the status data 214 may be determined based at least in part on availability data 216 provided by the test device 104. For example, the test device 104 may provide availability data 216 indicative of the ability to initiate a communication link 110(2) with the test device 104 using a Bluetooth network, and the communication device 102 may detect and determine an ability to establish a communication link 110(2) based on the availability data 216.

At a fifth time T5, the communication device 102 may provide one or more inputs to the test device 102. For example, the communication device 102 may establish a communication link 110(2) with the test device 104 and provide input data 212(2) to the test device 104 via the communication link 110(2). The input data 212(2) may correspond to the inputs provided to the communication device 102 in the command data 208. As described previously, the test device 104 may be configured to respond to inputs received via the communication link 110(2) even while in a locked or sleep mode. For example, the communication link 110(2) may include a Bluetooth communication link, and the input data 212(2) received by the test device 104 may be processed in the manner that inputs received from a Bluetooth human input device would normally be processed by the test device 104. Continuing the example, accessibility features of the test device 104 may enable inputs from a Bluetooth human input device to be processed at times when the test device 104 is in a locked mode, enabling the input data 212(2) to be used to transition the test device 104 from the locked mode. In some cases, a first input or set of inputs may be provided to the test device 104, then a length of time may be permitted to pass before a second input or set of inputs is provided to the test device 104. Inclusion of a delay between inputs or sets of inputs may enable the inputs to be processed by a test device 104 that is configured to disregard or refrain from processing inputs received in a short span of time, such as inputs associated with an automated device. In some implementations, one or more input sources 218 may be used to provide inputs to the communication device 102, which may in turn cause input data 212(2) to be provided to the test device 104. For example, while FIG. 2A depicts one or more input sources 218 providing input to the host device 106, in some cases, input may be provided from input sources 218 to the communication device 102 in addition to or in place of providing input to the host device 106.

At a sixth time T6, the communication device 102 may terminate the communication link 110(2) with the test device 104. For example, while the communication link 110(2) between the communication device 102 and test device 104 exists, the test device 104 may perform one or more functions differently due to communication with a human input device. Continuing the example, at the fifth time T5, FIG. 2B depicts the test device 104 presenting a first user interface that omits presentation of a displayed keyboard due to communication with the communication device 102, which may function as a human input device. At the sixth time T6, after termination of the communication link 110(2), the test device 104 may present a second user interface that includes the displayed keyboard due to the absence of a communication link 110 with a human input device. After the test device 104 has been transitioned from a non-responsive state. The host device 106 may continue to provide control data 202(3) to the test device 104 and receive output data 204 that may be logged, included in reports, and so forth.

Figure 3:
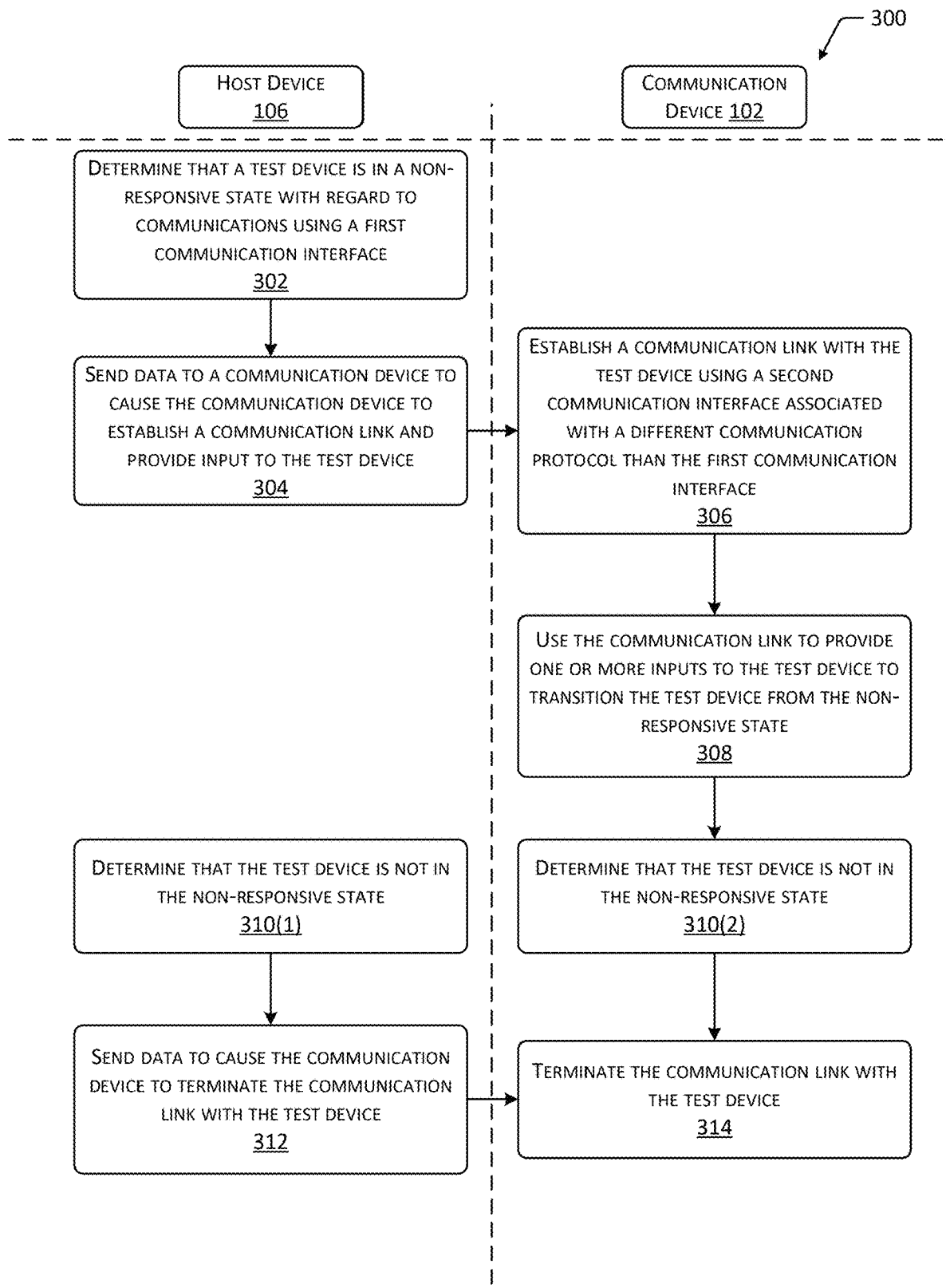
FIG. 3 is a flow diagram depicting an implementation of a process for using a communication device to transition a test device from a non-responsive state when the test device is not responsive to data received from a host device.

FIG. 3 is a flow diagram 300 depicting an implementation of a process for using a communication device 102 to transition a test device 104 from a non-responsive state when the test device 104 is not responsive to data received from a host device 106. At 302, a host device 106 may determine that a test device 104 is in a non-responsive state with regard to communications using a first communication interface 108(1). For example, the host device 106 may send control data 202 via a communication link 110(1) associated with the first communication interface 108(1). If the test device 104 does not respond to communications from the host device 106, is not detectable by the host device 106, or is determined by the host device 106 or another device in communication with the host device 106 to be in a locked mode, a sleep mode, or another non-responsive state, further communications from the host device 106 may not be processed by the test device 104. For example, if the test device 104 is in a locked mode, the test device 104 may remain non-responsive to data from other devices until a passcode or other input is received to transition the test device 104 from the locked mode.

At 304, the host device 106 may send data to a communication device 102 to cause the communication device 102 to establish a communication link 110(2) and provide input to the test device 104. As described with regard to FIG. 2A, command data 208 from the host device 106 may include device data 210 indicative of the test device 104 and input data 212 indicative of one or more inputs to be provided to the test device 104. For example, the inputs may correspond to a passcode or gesture to transition the test device 104 from a locked mode.

At 306, the communication device 102 may establish a communication link 110(2) with the test device 104 using a second communication interface 108(2) that is associated with a different communication protocol than the first communication interface 108(1). For example, the host device 106 may communicate with the test device 104 using a USB protocol, or one or more other protocols associated with a wired connection or one or more wireless networks. The communication device 102 may communicate with the test device 104 using a different protocol, such as a Bluetooth protocol. In some implementations, the communication device 102 may be part of the host device 106. For example, the host device 106 may include a second communication interface 108(2) and other components described herein with regard to the communication device 102. In other implementations, the communication device 102 may be a separate computing device that is in communication with the host device 106. For example, the communication device 102 may engage a USB port of the host device 106, or may communicate with the host device 106 using other wired or wireless communication methods. In some implementations, the communication device 102 and the test device 104 may have previously exchanged data used to establish the communication link 110(2), such as through a Bluetooth pairing process. In some cases, the pairing process may be initiated automatically, such as through use of the first communication link 110(1). For example, when a test device 104 is initially placed in communication with the host device 106 using the first communication link 110(1), commands or other data may be provided to the test device 104 using the first communication link 110(1) to cause the test device to initiate a pairing process with the communication device 102, or otherwise enable future communication between the test device 104 and communication device 102. The communication device 102 may determine status data 214 that indicates that the test device 104 is detectable and that the communication device 102 is able to establish the communication link 110(2) with the test device 104. For example, the test device 104 may periodically provide availability data 216 indicative of the availability of the test device 104 to establish Bluetooth communication links with devices that have been paired with the test device 104.

At 308, the communication device 102 may use the communication link 110(2) to provide one or more inputs to the test device 104 to transition the test device 104 from the non-responsive state. For example, the test device 104 may include a smartphone, a tablet computer, or another type of computing device that is configured to receive inputs from external human input devices, such as a keyboard or mouse device (e.g., pointer device) that communicates with the test device 104 using Bluetooth or another communication protocol. The test device 104 may include accessibility features that permit use of the human input device to provide inputs to transition the test device 104 from a locked or sleep mode. For example, the accessibility features may allow users that have difficulty providing touchscreen inputs or users that prefer to use an external input device to manipulate the test device 104. Continuing the example, the communication device 102 may provide input data 212 to the test device 104 that may correspond to a passcode, gesture, or other input that may cause the test device 104 to terminate a locked mode, a sleep mode, or another type of non-responsive state. While the communication device 102 may not necessarily include a human input device, the communication device 102 may send data or include components that cause the test device 104 to process inputs from the communication device 102 as though the communication device 102 includes a human input device. For example, the communication device 102 may include a Bluetooth chip or other hardware or software components that may cause the test device 104 to process inputs from the communication device 102 as though the communication device 102 includes a Bluetooth keyboard. In some implementations, the communication device 102 may confirm that the inputs provided to the test device 104 were received and processed. In other implementations, the host device 106 may determine that the test device 104 has transitioned from the non-responsive state. In still other implementations, both the host device 106 and the communication device 102 may make such a determination.

For example, at 310(1), the host device 106 may determine that the test device 104 is not in the non-responsive state. Continuing the example, the host device 106 may determine an ability to detect the test device 104, exchange data with the test device 104, receive a response from the test device 104, and so forth. In some implementations, the host device 106 may provide an indication of this determination to the communication device 102. At 310(2) the communication device 102 may determine that the test device 104 is not in the non-responsive state. For example, the communication device 102 may determine that the inputs provided to the test device 104 were processed and that the test device 104 has terminated a locked or sleep mode, or other non-responsive state. In some implementations, the communication device 102 may provide an indication of this determination to the host device 106.

At block 312, the host device 106 may send data to the communication device 102 to cause the communication device 102 to terminate the communication link 110(2) with the test device 104. At 314, the communication device 102 may terminate the communication link 110(2) with the test device 104. In other implementations, the communication device 102 may terminate the communication link 110(2) independent of data from the host device 106, such as if the communication device 102 determines that the test device 104 has transitioned from the non-responsive state. Termination of the communication link 110(2) may affect one or more functions performed by the test device 104. For example, a communication link 110(2) with a human input device, such as an external keyboard, may cause the test device 104 to perform one or more functions differently, such as by omitting presentation of an on-screen keyboard. To prevent the communication link 110(2) with the communication device 102 from affecting performance of the application or test device 104, after determining that the test device 104 is no longer in a non-responsive state, the communication link 110(2) may be terminated. For example, the test device 104 may display a first user interface when the communication link 110(2) with the communication device 102 is present, then begin presenting a second user interface that differs from the first user interface after the communication link 110(2) is terminated.

Figure 4:
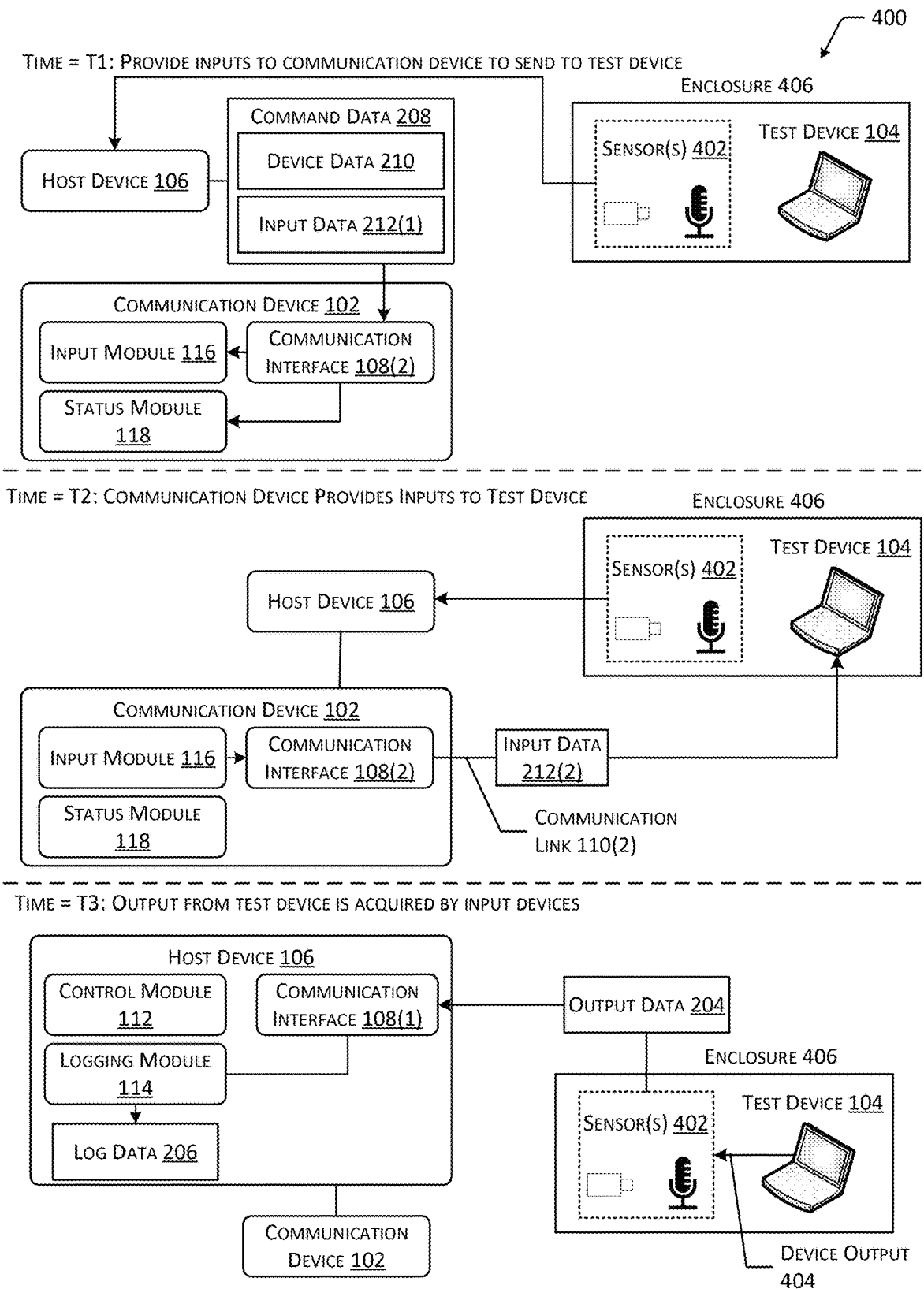
FIG. 4 is a diagram depicting an implementation of a process for using a communication device to provide input to a test device that is not configured to perform functions in response to input from a host device and acquire data indicative of output from the test device using separate sensors.

FIG. 4 is a diagram 400 depicting an implementation of a process for using a communication device 102 to provide input to a test device 104 that is not configured to perform functions in response to input from a host device 106 and acquire data indicative of output from the test device 104 using separate sensors 402. For example, certain types of test devices 104 may not be capable of receiving input events via a USB communication link 110(1) or other type of communication channel associated with a host device 106. As another example, a test device 104 that is capable of receiving inputs via a USB communication link may not currently be configured to process input data 212(1) from the host device 106. In such cases, the communication device 102 may be used to provide input data 212(2) to the test device 104 using a separate communication link 110(2). For example, the communication link 110(2) associated with the communication device 102 may be a Bluetooth communication link, and the test device 104 may be configured to process input data 212(2) received from the communication device 102 in the manner of an external human input device. Therefore, the communication device 102 may be used to control the test device 104, such as by providing test inputs to the test device 104 in cases where the test device 104 is unable to be controlled using the host device 106.

At a first time T1, the host device 106 may provide input data 212(1) to the communication device 102 to be used to control the test device 104. For example, the host device 106 may provide command data 208 to the communication device 102 that includes device data 210 indicative of the test device 104 and input data 212(1) indicative of one or more inputs to be provided to the test device 104. The status module 118 associated with the communication device 102 may determine status data 214 indicative of a status of the test device 104, such as whether the communication device 102 is able to detect the test device 104, exchange data with the test device 104, and so forth. In some cases, the status data 214 may indicate characteristics of input data 212 for use with the test device 104. For example, based on the status data 214, the input module 116 associated with the communication device 102 may be used to generate input data 212(2) that may be processed by the test device 104 to cause performance of a function.

At a second time T2, the communication device 102 may provide the input data 212(2) to the test device 104. The input data 212(2) may be provided with data indicative of one or more human input devices, such as a Bluetooth keyboard or mouse device (e.g., pointer device). For example, the input data 212(2) may be configured to cause the test device 104 to process the input data 212(2) as though the input data 212(2) was provided using a human input device, even in cases where a physical human input device is not present. Continuing the example, the test device 104 may include accessibility features that process inputs from human input devices, and the input data 212(2) may be processed using the accessibility features. The input data 212(2) may cause the test device 104 to perform one or more functions. For example, the test device 104 may present device output 404 using one or more output devices associated with the test device 104. However, in cases where the test device 104 is unable to receive input from the host device 106 using a communication link 110(1), the test device 104 may also be unable to send data indicative of the device output 404 to the host device 106 via the communication link 110(1). In such a case, the device output 404 may be acquired using one or more sensors 402.

For example, at a third time T3, one or more sensors 402 in an environment with the test device 104 may acquire output data 204 indicative of the device output 404 presented by the test device 104. Continuing the example, the test device 104 may present visible output using a display device, and one or more of the sensors 402 may include a camera that acquires image data or video data based on the visible output. As another example, the test device 104 may output audio using one or more audio output devices, and one or more of the sensors 402 may include a microphone that acquires audio data based on the audio output. In some implementations, the sensors 402 may be positioned within an enclosure 406 with the test device 104, such as to reduce interference to acquisition of the output data 204 that may be caused by ambient light, noise, vibration, and so forth. For example, the sensors 402 may be associated with a computing device that is positioned within the enclosure 406 that may acquire and send the output data 204 to one or more of the host device 106 or the communication device 102. In other implementations, the sensors 402 may communicate directly with the host device 106 or communication device 102 without use of a separate computing device that includes the sensors 402. While FIG. 4 depicts the sensors 402 in communication with the host device 106 and providing output data 204 to the host device 106, in other implementations, the sensors 402 may provide the output data 204 to the communication device 102, which may in turn provide at least a portion of the output data 204 to the host device 106. The host device 106 may generate log data 206 based at least in part on the output data 204.

Figure 5:
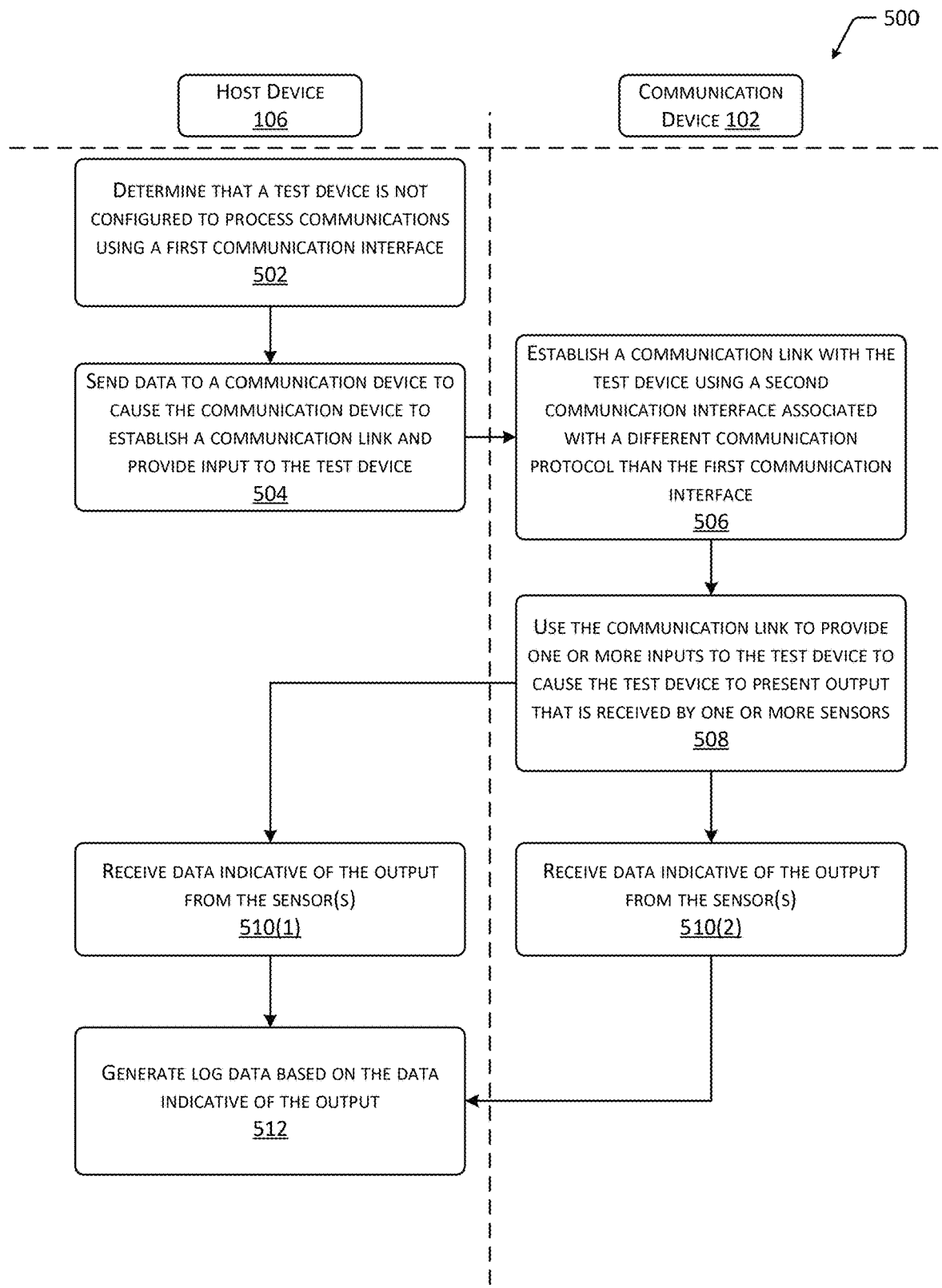
FIG. 5 is a flow diagram depicting an implementation of a process for using a communication device to provide input to a test device that is not configured to perform functions in response to input from a host device.

FIG. 5 is a flow diagram 500 depicting an implementation of a process for using a communication device 102 to provide input to a test device 104 that is not configured to perform functions in response to input from a host device 106. At 502, the host device 106 may determine that a test device 104 is not configured to process communications using a first communication interface 108(1) of the host device 106. For example, the host device 106 may store or access data indicative of components or characteristics of the test device 104 and may determine one or more configuration(s) of the test device 104 based on this data. In other implementations, the host device 106 may determine that the test device 104 is not responsive to data from the host device 106, or is not detectable by the host device 106 or able to receive data from the host device 106. Continuing the example, the host device 106 may be configured to provide input data 212(1) to test devices 104 using a USB communication link 110(1), but the test device 104 may not be configured to receive or process data using the communication link 110(1).

At 504, the host device 106 may send data to the communication device 102 to cause the communication device 102 to establish a communication link 110(2) with the test device 104 and provide input to the test device 104. For example, command data 208 from the host device 106 may be provided to the communication device 102. The command data 208 may include one or more identifiers or other device data 210 indicative of the test device 104 and input data 212(1) indicative of one or more inputs to be provided to the test device 104.

At 506, the communication device 102 may establish a communication link 110(2) with the test device 104 using a second communication interface 108(2) associated with a different communication protocol than the first communication interface 108(1). For example, the communication link 110(2) associated with the communication device 102 may be a Bluetooth communication link, and the test device 104 may be configured to process inputs received via the communication link 110(2) using one or more accessibility features of the test device 104.

At 508, the communication device 102 may use the communication link 110(2) to provide one or more inputs to the test device 104. The inputs may cause the test device 104 to present output. The output may be received by one or more sensors 402. For example, as described with regard to FIG. 4, one or more sensors 402 within an environment with the test device 104 may determine output presented using a display, speaker, or other output device associated with the test device 104. The sensor(s) 402 may provide data indicative of this output to one or more of the host device 106 or the communication device 102.

For example, at 510(1), the host device 106 may receive data indicative of the output from the sensor(s) 402. At 510(2), the communication device 102 may receive data indicative of the output from the sensor(s) 402. The host device 106, the communication device 102, or both the host device 106 and the communication device 102 may be configured to receive data from the sensor(s) 402.

At 512, the host device 106 may generate log data 206 based on the data indicative of the output. The host device 106 may receive the data indicative of the output directly from the sensor(s) 402, from the communication device 102, or from both the communication device 102 and the sensor(s) 402.

Figure 6:
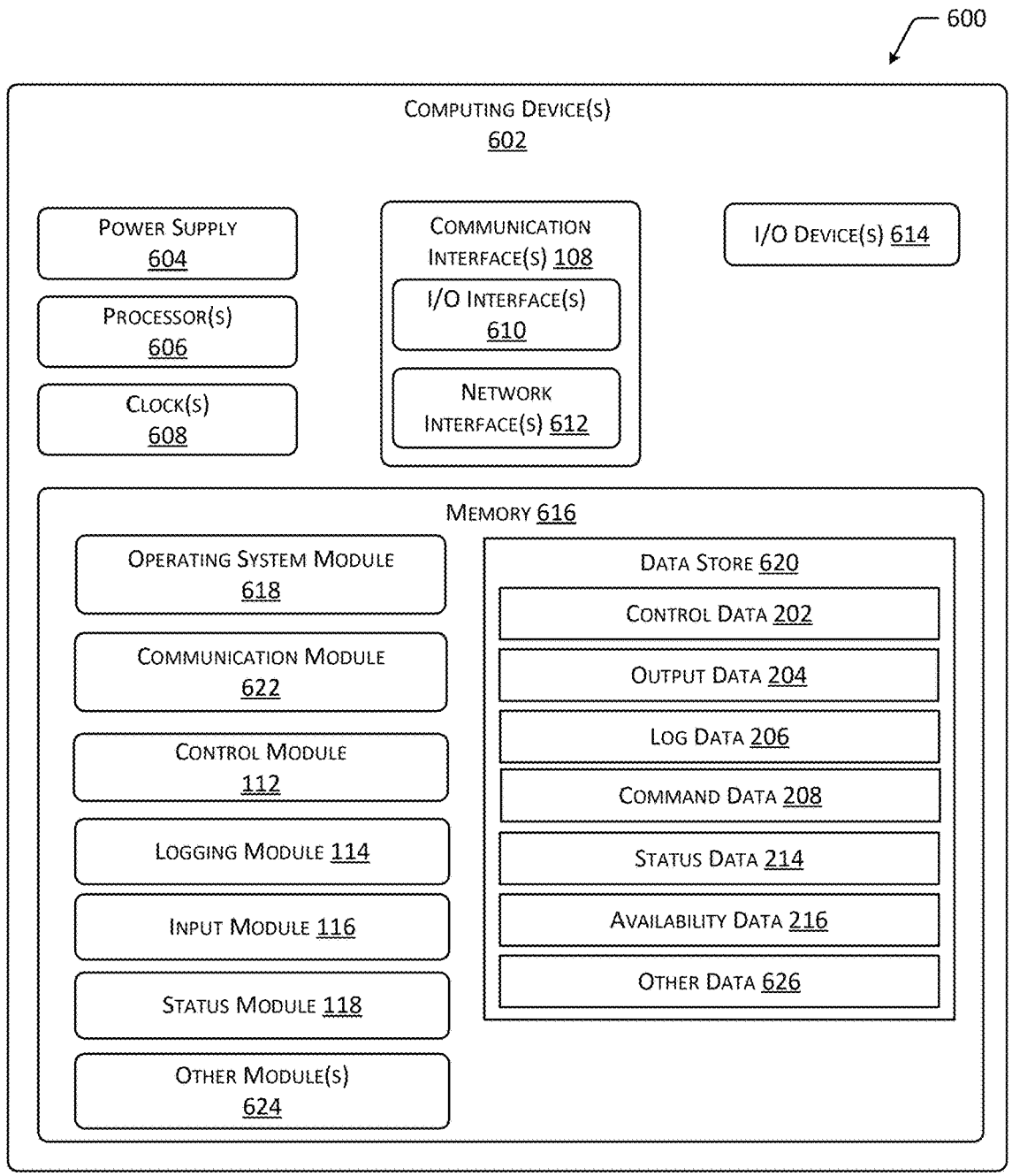
FIG. 6 is a block diagram depicting an implementation of one or more computing devices within the present disclosure.

FIG. 6 is a block diagram 600 depicting an implementation of one or more computing devices 602 within the present disclosure. In some implementations, the computing device 602 may include one or more host devices 106, as shown in FIGS. 1, 2, and 4 or other computing devices 602 in communication with a host device 106. In some implementations, the computing device 602 may include one or more communication devices 102, as shown in FIGS. 1, 2, and 4. Additionally, in some implementations, the computing device 602 may include one or more test devices 104. As such, while FIG. 6 depicts a single block diagram 600, the functions described with regard to the computing device 602 of FIG. 6 may be performed using a single computing device 602 or multiple computing devices 602. For example, a single computing device 602 may include multiple communication interfaces 108 and may communicate with test devices 104 using different types of communication links 110 and communication protocols. In other cases, multiple computing devices 602, such as a separate host device 106 and communication device 102, may communicate with test devices 104 using different protocols and communication links 110. Additionally, in some cases, one or more of the functions described herein with regard to the host device 106 or communication device 102 may be performed by one or more test devices 104. For example, a test device 104 may also include hardware or software components that enable the test device 104 to function as a host device 106, such as by acquiring and logging data indicative of performance of an application or of the test device 104. Therefore, while FIG. 6 depicts a single block diagram 600 of a computing device 602, any number and any type of computing devices 602 may be used to perform the functions described herein. For example, as shown in FIGS. 1, 2, and 4, a host device 106 and a communication device 102 may include separate computing devices 602 that perform the functions described herein.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clock(s) 608 may provide information indicative of date, time, ticks, and so forth. For example, the processor(s) 606 may use data from the clock 608 to generate a timestamp, trigger a preprogrammed action, and so forth. The clock(s) 608 may also be used to determine times to provide inputs to other computing devices 602, such as by delaying a selected length of time between inputs or sets of inputs to enable the inputs to be processed by the computing device 602 that receives them.

The computing device 602 may include one or more communication interfaces 108 that may be used to establish communication links 110 with other computing devices 602, exchange data, and so forth. For example, the communication interfaces 108 may include input/output (I/O) interfaces 610, network interfaces 612, and so forth. The communication interfaces 108 may enable the computing device 602, or components of the computing device 602, to communicate with other computing devices 602 or components of the other computing devices 602. The I/O interfaces 610 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 610 may couple to one or more I/O devices 614. The I/O devices 614 may include any manner of input devices or output devices associated with the computing device 602. For example, I/O devices 614 may include touch sensors, displays, touch sensors integrated with displays (e.g., touchscreen displays), keyboards, mouse devices or other types of pointer devices, microphones, image sensors, cameras, scanners, speakers or other types of audio output devices, haptic devices, printers, and so forth. In some implementations, the I/O devices 614 may be physically incorporated with the computing device 602. In other implementations, I/O devices 614 may be externally placed. In some cases, a computing device 602 may not necessarily include a physical I/O device 614, but may provide data to another computing device 602 that is processed as though the data was input using a physical I/O device 614.

The network interfaces 612 may be configured to provide communications between the computing device 602 and other devices, such as the I/O devices 614, routers, access points, and so forth. The network interfaces 612 may include devices configured to couple to one or more networks including local area networks (LANs), wireless LANs (WLANs), wide area networks (WANs), wireless WANs, and so forth. For example, the network interfaces 612 may include devices compatible with Ethernet, Wi-Fi, Bluetooth, ZigBee, Z-Wave, 4G, 5G, LTE, and so forth.

The computing device 602 may include one or more buses or other internal communications hardware or software that allows for the transfer of data between the various modules and components of the computing device 602.

As shown in FIG. 6, the computing device 602 may include one or more memories 616. The memory 616 may include one or more computer-readable storage media (CRSM). The CRSM may be any one or more of an electronic storage medium, a magnetic storage medium, an optical storage medium, a quantum storage medium, a mechanical computer storage medium, and so forth. The memory 616 may provide storage of computer-readable instructions, data structures, program modules, and other data for the operation of the computing device 602. A few example modules are shown stored in the memory 616, although the same functionality may alternatively be implemented in hardware, firmware, or as a system on a chip (SoC).

The memory 616 may include one or more operating system (OS) modules 618. The OS module 618 may be configured to manage hardware resource devices such as the I/O interfaces 610, the network interfaces 612, the I/O devices 614, and to provide various services to applications or modules executing on the processors 606. The OS module 618 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Washington, USA; or other operating systems.

One or more data stores 620 and one or more of the following modules may also be associated with the memory 616. The modules may be executed as foreground applications, background tasks, daemons, and so forth. The data store(s) 620 may use a flat file, database, linked list, tree, executable code, script, or other data structure to store information. In some implementations, the data store(s) 620 or a portion of the data store(s) 620 may be distributed across one or more other devices including other computing devices 602, network attached storage devices, and so forth.

A communication module 622 may be configured to establish communications with one or more other computing devices 602. Communications may be authenticated, encrypted, and so forth.

The memory 616 may also store the control module 112. The control module 112 may provide commands or other data to one or more other computing devices 602 to cause the other computing device(s) 602 to perform functions. For example, the control module 112 may provide control data 202 to cause a computing device 602 to execute an application, perform one or more functions associated with an application, perform one or more functions independent of an application, provide data to the computing device 602 that provided the control data 202, and so forth.

The memory 416 may additionally store the logging module 114. The logging module 114 may receive data indicative of received inputs, presented outputs, or other metrics associated with one or more of computing devices 602. The received data may be used to determine performance of the application or of the computing device(s) 602 associated with the application under various conditions. For example, a computing device 602 may generate log data 206 based on the received data, which may be used to generate reports, identify issues associated with the application, and so forth.

The memory 616 may store the input module 116. The input module 116 may be used to provide inputs to a computing device 602, such as to cause the computing device 602 to terminate a locked or sleep mode. Data generated using the input module 116 may not necessarily be associated with a physical human input device, but may be associated with or provided with data indicative of a human input device. For example, inputs provided using the input module 116 may be processed by a receiving computing device 602 as though the inputs were generated using a human input device, even when a human input device was not used to generate the inputs.

The memory 616 may also store the status module 118. The status module 118 may determine status data 214 associated with one or more computing devices 602. For example, status data 214 may indicate particular computing devices 602 with which communication links 110 may be established, computing devices 602 determined to be in responsive or non-responsive states, and so forth. In some implementations, at least a portion of the status data 214 may be provided to one or more other computing devices 602. For example, a communication device 102 may provide status data 214 indicative of the status of one or more test devices 104 to the host device 106. In some cases, status data 214 may be determined based in part on availability data 216 provided by a computing device 602. For example, availability data 216 may be provided to other computing devices 602 using a Bluetooth network or other type of network, and the status of the computing device 602 providing the availability data 216 may be determined based at least in part on the availability data 216.

Other modules 624 may also be present in the memory 616. For example, other modules 624 may include permission or authorization modules to enable users to access and modify data associated with the computing device 602. Other modules 624 may include permission modules to enable a user to opt in or otherwise provide authorization for data to be acquired using a computing device 602 and stored or transmitted to one or more other computing devices 602. Other modules 624 may also include encryption modules to encrypt and decrypt communications between computing devices 602, authentication modules to authenticate communications sent or received by computing devices 602, user interface modules to generate interfaces for receiving input from users, and so forth. Other modules 624 may also include modules for generating reports based on log data 206, determining potential issues based on portions of the log data 206, and so forth.

Other data 626 within the data store(s) 620 may include configurations, settings, preferences, and default values associated with computing devices 602. Other data 626 may also include encryption keys and schema, access credentials, and so forth.

In different implementations, different computing devices 602 may have different capabilities or capacities. For example, host devices 106 may have greater processing capabilities or data storage capacity than communication devices 102 or test devices 104.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a first computing device comprising:
one or more first memories storing first computer-executable instructions; and
one or more first hardware processors to execute the first computer-executable instructions to:
determine one or more of:
a failure to detect a second computing device;
a data transmission failure between the first computing device and the second computing device using a first communication interface;
that the second computing device is one or more of in a locked mode or in a sleep mode; or that the second computing device is not configured to one or more of receive or process data associated with the first communication interface;
determine first data based on the first communication interface that includes one or more first inputs to provide to the second computing device;
based on the first data, generate second data that comprises one or more second inputs to provide to the second computing device using a second communication interface;
establish a communication link with the second computing device using the second communication interface; and
send the second data to the second computing device using the communication link to cause the second computing device to perform a function based on the one or more second inputs.

2. The system of claim 1, further comprising a third computing device, wherein the third computing device comprises:
the first communication interface;
one or more second memories storing second computer-executable instructions; and
one or more second hardware processors to execute the second computer-executable instructions to:
determine third data indicative of the one or more of:
the failure to detect the second computing device;
the data transmission failure; or
that the second computing device is one or more of in a locked mode or in a sleep mode; or
that the second computing device is not configured to one or more of receive or process data associated with the first communication interface; and
provide the first data to the first computing device in response to determining the third data.

3. The system of claim 1, wherein the second computing device presents a first user interface based on the communication link with the first computing device, the system further comprising first computer-executable instructions to:
after providing the second data to the second computing device, terminate the communication link with the second computing device, wherein the second computing device presents a second user interface after termination of the communication link with the first computing device.

4. The system of claim 3, further comprising first computer-executable instructions to:
determine performance of the function based on the one or more first inputs by the second computing device, wherein the communication link is terminated in response to determining the performance of the function.

5. The system of claim 3, further comprising a third computing device, wherein the third computing device comprises:
the first communication interface;
one or more second memories storing second computer-executable instructions; and
one or more second hardware processors to execute the second computer-executable instructions to:
after the first computing device provides the second data to the second computing device, determine third data indicative of one or more of:
detection of the second computing device using the first communication interface;
successful data transmission between the second computing device and the third computing device using the first communication interface; or
termination of one or more of a locked mode or a sleep mode associated with the second computing device; and
send fourth data to the first computing device, wherein the fourth data is indicative of the third data, and wherein the first computing device terminates the communication link with the second computing device in response to the fourth data.

6. The system of claim 1, further comprising first computer-executable instructions to:
before receiving the first data, provide third data to the second computing device, wherein the third data includes information to enable the second computing device to establish the communication link with the first computing device; and
before receiving the first data, receive fourth data from the second computing device, wherein the fourth data includes information to enable the first computing device to establish the communication link with the second computing device.

7. The system of claim 1, further comprising first computer-executable instructions to:
determine third data associated with the second computing device, wherein the third data is indicative of one or more of:
detection of the second computing device;
that the second computing device is responsive to communication using the communication link associated with the second communication interface;
that the second computing device is one or more of in a locked mode or in a sleep mode;
performance of the function based on the one or more first inputs by the second computing device; or
termination of one or more of the locked mode or the sleep mode associated with the second computing device.

8. The system of claim 1, wherein the communication link between first computing device and the second computing device is associated with a first communication protocol and the first communication interface is associated with a second communication protocol that differs from the first communication protocol, and wherein the communication link is usable independent of communication with the second computing device using the first communication interface.

9. The system of claim 1, wherein the one or more first inputs include at least a first input and a second input, the system further comprising first computer-executable instructions to:
provide a first portion of the second data to the second computing device at a first time, wherein the first portion is associated with the first input; and
provide a second portion of the second data to the second computing device at a second time, wherein the second portion is associated with the second input, and wherein the second time occurs a selected length of time after the first time.

10. A device, comprising:
one or more memory devices configured to store computer-executable instructions; and
one or more processors to execute the computer-executable instructions to:
determine one or more of:
a failure to detect a computing device;

a data transmission failure between the device and the computing device using a first communication interface;

that the computing device is one or more of in a locked mode or in a sleep mode; or that the computing device is not configured to one or more of receive or process data associated with the first communication interface;

determine first data based on the first communication interface that includes one or more first inputs to provide to the computing device;

based on the first data, generate second data that comprises one or more second inputs to provide to the computing device using a second communication interface;

establish a communication link with the computing device using the second communication interface; and send the second data to the computing device using the communication link to cause the computing device to perform a function based on the one or more second inputs.

11. The device of claim 10, wherein the computing device presents a first user interface based on the communication link, and wherein the one or more processors further:

after providing the second data to the computing device, terminate the communication link with the computing device, wherein the computing device presents a second user interface after termination of the communication link.

12. The device of claim 11, wherein the one or more processors further:

determine performance of the function based on the one or more first inputs by the computing device, wherein the communication link is terminated in response to determining the performance of the function.

13. The device of claim 10, wherein the one or more processors further:

before receiving the first data, provide third data to the computing device, wherein the third data includes information to enable the computing device to establish the communication link with the device; and before receiving the first data, receive fourth data from the computing device, wherein the fourth data includes information to enable the device to establish the communication link with the computing device.

14. The device of claim 10, wherein the one or more processors further:

determine third data associated with the computing device, wherein the third data is indicative of one or more of:

detection of the computing device;

that the computing device is responsive to communication using the communication link associated with the second communication interface;

that the computing device is one or more of in the locked mode or in the sleep mode;

performance of the function based on the one or more first inputs by the computing device; or termination of one or more of the locked mode or the sleep mode associated with the computing device.

15. The device of claim 10, wherein the communication link is associated with a first communication protocol and the first communication interface is associated with a second communication protocol that differs from the first communication protocol, and wherein the communication link is usable independent of communication with the computing device using the first communication interface.

16. The device of claim 10, wherein the one or more first inputs include at least a first input and a second input, and wherein the one or more processors further:

provide a first portion of the second data to the computing device at a first time, wherein the first portion is associated with the first input; and provide a second portion of the second data to the computing device at a second time, wherein the second portion is associated with the second input, and wherein the second time occurs a selected length of time after the first time.

* * * * *